(12) United States Patent
Ohba et al.

(10) Patent No.: US 7,587,598 B2
(45) Date of Patent: Sep. 8, 2009

(54) INTERLAYER FAST AUTHENTICATION OR RE-AUTHENTICATION FOR NETWORK COMMUNICATION

(75) Inventors: Yoshihiro Ohba, Torrance, CA (US); Yashuhiro Katsube, Franklin Lakes, NJ (US); Shinichi Baba, Irvine, CA (US); Anthony McAuley, Glen Ridge, NJ (US); Subir Das, Edison, NJ (US)

(73) Assignees: Toshiba America Research, Inc., Morristown, NJ (US); Telcordia Technologies, Inc., Morristown, NJ (US)

( * ) Notice: Subject to any disclaimer, the term of this patent is extended or adjusted under 35 U.S.C. 154(b) by 512 days.

(21) Appl. No.: 10/609,685

(22) Filed: Jul. 1, 2003

(65) Prior Publication Data

US 2004/0098588 A1      May 20, 2004

Related U.S. Application Data

(60) Provisional application No. 60/427,185, filed on Nov. 19, 2002.

(51) Int. Cl.
   *H04L 9/32*       (2006.01)
(52) U.S. Cl. .................. 713/169; 713/151; 726/3; 726/14; 380/33; 380/270; 709/203
(58) Field of Classification Search .............. 713/168, 713/169, 151, 152; 726/3, 14; 709/203, 709/218, 227, 229; 370/338; 380/270, 33
See application file for complete search history.

(56) References Cited

U.S. PATENT DOCUMENTS 5,625,775 A * 4/1997 Davis et al. ................ 709/227

(Continued)

FOREIGN PATENT DOCUMENTS

JP         2004-528761 A        9/2004

(Continued)

OTHER PUBLICATIONS

Internet Printout: http://xml.resource.org/public/rfc/html/rfc2284. html—PPP Extensible Authentication Protocol (EAP), dated Oct. 27, 2007.

(Continued)

*Primary Examiner*—Kimyen Vu
*Assistant Examiner*—April Y Shan
(74) *Attorney, Agent, or Firm*—Banner & Witcoff, Ltd

(57) ABSTRACT

A system and method are provided for establishing a network communication session using fast authentication. In a network system a client or user device may establish a communication session with a server using full authentication. If the session is interrupted or discontinued and resumption of the session is requested, a session identifier of the previously established session may be compared to the session identifier of the requested session. If a match is detected, the session may be resumed using a fast authentication (or re-authentication) procedure such that the session is resumed more efficiently and expediently. Fast authentication may be performed, for example, even when the first session and the resumed second session are of different authentication layers, different types of network interfaces and/or different locations. Thus, a session, such as a TLS session, may resume functionality among multiple defined authentication protocols or technologies such as 802.1X, PANA or cellular based systems.

22 Claims, 8 Drawing Sheets

U.S. PATENT DOCUMENTS

| | | | | |
|---|---|---|---|---|
| 5,889,962 | A * | 3/1999 | Hanif et al. | 709/228 |
| 6,412,007 | B1 * | 6/2002 | Bui et al. | 709/227 |
| 6,412,077 | B1 * | 6/2002 | Roden et al. | 714/4 |
| 6,571,287 | B1 * | 5/2003 | Knight et al. | 709/225 |
| 6,874,031 | B2 * | 3/2005 | Corbeil | 709/229 |
| 7,028,073 | B1 * | 4/2006 | Bui et al. | 709/203 |
| 7,260,638 | B2 * | 8/2007 | Crosbie | 709/229 |
| 7,281,128 | B2 * | 10/2007 | Mikel et al. | 713/155 |
| 7,360,075 | B2 * | 4/2008 | VanHeyningen et al. | 713/151 |
| 7,385,957 | B2 * | 6/2008 | O'Neill | 370/338 |
| 2002/0174335 | A1 * | 11/2002 | Zhang et al. | 713/168 |
| 2003/0226017 | A1 * | 12/2003 | Palekar et al. | 713/168 |
| 2004/0068573 | A1 * | 4/2004 | Corbeil | 709/229 |
| 2004/0111393 | A1 * | 6/2004 | Moore et al. | 707/3 |
| 2004/0148504 | A1 * | 7/2004 | Forsberg | 713/168 |
| 2004/0203752 | A1 * | 10/2004 | Wojaczynski et al. | 455/432.1 |

FOREIGN PATENT DOCUMENTS

| | | | |
|---|---|---|---|
| WO | 02-077820 | A1 | 10/2002 |

OTHER PUBLICATIONS

Brochure: Port-Based Network Access Control, IEEE Standard for Local and metropolitan area networks, 2001.

Internet Printout: http://www.ietf.org/internet-drafts/draft-ieft-pppext-eap-ttls-05.txt—EAP Tunneled TLS Authentication Protocol (EAP-TTLS). dated Oct. 26, 2004.

Internet Printout: http://www.faqs.org/rfcs/rfc2716.html—RFC 2716—PPP EAP TLS Authentication Protocol, dated Oct. 26, 2004.

R.L. Rivest et al., A Method for Obtaining Digital Signatures and Public-Key Cryptosystems, Communications of the ACM, vol. 21, No. 2, pp. 120-126, Feb. 1978.

Internet Printout: http://www.ietf.org/proceedings/02nov/I-D/draft-ietf-pana-usage-scenarios-02.txt—Problem Space and Usage Scenarios for PANA, dated Oct. 26, 2004.

Whitfield Diffie et al., "New Directions in Cryptography", pp. 29-40.

Internet Printout: http://www.ietf.org/proceedings/02jul/I-D/draft-ietf-pana-requirements-02.txt—Protocol for Carrying Authentication for Network Access (PANA), dated Oct. 26, 2004.

Internet Printout: http://www.drizzle.com/"aboba/IEEE/draft-josefsson-pppext-eap-tls-eap-02.txt—Protected EAP Protocol (PEAP), dated Oct. 26, 2004.

Odyssey Server Administration Guide, 2002.

Internet Printout: http://www.drizzle.com/"aboba/IEEE/draft-ohba-pana-potls-01.txt—PANA over TLS, dated Oct. 26, 2004.

Internet Printout: http://www.faqs.org/rfcs/rfc2246-html—RFC 2246—The TLS Protocol Version 1.0, dated Oct. 26, 2001.

Office Action in JP Application No. 2003-389376, mailed Jun. 9, 2009 with machine translation of office action.

* cited by examiner

US 7,587,598 B2

INTERLAYER FAST AUTHENTICATION OR RE-AUTHENTICATION FOR NETWORK COMMUNICATION

This application claims the benefit of U.S. Provisional Application 60/427,185, filed Nov. 19, 2002, incorporated herein in its entirety.

TECHNICAL FIELD

Aspects of the present invention relate to fast authentication for network communication and, in particular, fast authentication for network communication/access over multiple authentication protocols and/or technologies.

BACKGROUND

The use of networks is widespread. Millions of people connect daily to a network, such as the Internet. Networks have become commonplace and essential to communicate with others, exchange data, or perform business activities, for example. With the rapid growth in the number and type of devices and terminals accessing the Internet, users can potentially use devices having the capability of attaching via different multiple access media and technologies to interface to the network. However, as more people utilize the convenience of communication over a network, there has been an increase in the concerns for security over the network. For example, a user may wish to communicate with another user without the risk of a third party intervening or eavesdropping. Secure communication is also necessary for many business activities such as accessing an account over the network or accessing private information, either of which may be a wired or a wireless network. A user attempting to access his private account information over a network would desire his private information to be accessed only by authorized individuals without the threat of eavesdropping or tampering by unauthorized individuals.

The Internet lacks security and many of the protocols used in the Internet do not provide any security at all. Hackers have tools to sniff passwords off of the network leaving unencrypted passwords being sent over the network extremely vulnerable. Also, some client/server applications rely on the client program to provide the identity of the user who is using it. As there might be no verification process, a hacker may misidentify himself to gain unauthorized access to private data. Some applications allow the user to self-restrict himself to only perform activities that the user is permitted to do. In these applications, there might be no enforcement which might lead to breaches of security if the user is not completely honest. Thus, network access technologies have been evolving rapidly to meet the need for network security.

In response to security concerns, methods and protocols were devised to provide for network access authentication. The Transport Layer Security (TLS) protocol was derived from SSL and has been used to provide privacy and data integrity between two communicating applications by providing certificate-based peer authentication. Thus, TLS provides secure communication over a network. HTTP was originally used freely on the Internet without regard to security of sensitive material. However, increased use of HTTP for private applications necessitated that measures be taken to ensure security. Using the TLS protocol, a client initiates a connection to a server and begins a TLS handshake. After the TLS handshake is complete, the client initiates the first HTTP request. The HTTP data is sent as TLS application data. As an example, a user may access his bank account over the Internet through secure HTTP. Secure HTTP uses the TLS protocol secure transport mechanism such that unauthorized users may not access the private information.

The TLS protocol provides a secure communication channel between peer entities. The peer entities may authenticate themselves to one another by the use of a shared secret key between the two peer entities in the connection in which the peer entities exchange key information. Public-key based technology and cryptosystems, such as the Diffie-Hellman key agreement protocol or the RSA cryptosystem, are used to share and create the secret key. For example, each of a first and a second user generates a corresponding private value drawn from a set of values. Using the private values, each of the first and second users generate and exchange corresponding public values to compute a shared secret key. The secret key provides authentication for the authorized users such that the communication between the first and second users is protected from unauthorized users who do not possess the secret key.

In addition, TLS further provides for session resumption under certain circumstances. If a secret key has already been established, TLS supports rapid session resumption within an application that uses the TLS for securing the communication channel between the communicating entities using the already established master secret key.

Extensible Authentication Protocol (EAP) was also developed in response to an increasing demand for user authentication for remote access users. EAP is a general protocol that provides, a framework for various network authentication methods. Originally developed to support PPP authentication, EAP has been expanded to support other authentication protocols such as for wireless LAN access, layer 3 network access, layer 2-based network technology, PANA (Protocol for, Carrying Authentication for Network Access), or 802.1X for example. Some authentication methods support carrying TLS messages for establishing a secure channel between a client and an authentication server. Passwords or other data may be carried with the encryption over the secure channel. EAP selects a specific authentication method during the authentication phase so that an authenticator may request more information before determining the specific authentication mechanism to be used. EAP authentication methods that support carrying TLS messages include EAP-TLS (Extensible Authentication Protocol-Transport Layer Security), EAP-TTLS (Extensible Authentication Protocol-Tunneled Transport Layer Security), or PEAP (Protected Extensible Authentication Protocol), for example.

EAP authentication methods that support TLS messages may support fast re-authentication based on TLS. For example, the Odyssey system developed by Funk Software provides wireless LAN authentication based on 802.1X and EAP-TTLS. The system uses TLS session resumption for fast re-authentication when clients roam within a single layer 2 technology, for example, among 802.11a or 802.11b access points. However, this scheme does not provide for flexible roaming among defined technologies such as roaming between wireless LAN and server based network or roaming between wireless LAN and wired Ethernet, for example.

There is currently no known method or system for permitting clients to roam among multiple layer 2 technologies with fast re-authentication while maintaining security (i.e., interlayer TLS sharing). There is also no known method or system for performing multiple levels of authentication and access control at different layers. Enabling fast re-authentication across multiple layers or different subnets in one or, more layers would provide greater convenience to users during re-authentication by providing a more rapid secure authentication.

Thus, a need exists in the art for a method and system for providing fast re-authentication across different layers or providing fast re-authentication across different subnets in one or more layers.

SUMMARY

A method, system and apparatus is provided for providing fast authentication or re-authentication of a communication session. For example, a user device or client may establish a communication session in a network via full authentication. During full authentication, a session identifier associated with the session may be derived. The session may further be performed at any of a number of authentication layers. For example, full authentication may be performed at layer 2 using 802.1X as the layer 2 authentication protocol. Full authentication may also be performed at layer 3, for example, using the PANA authentication protocol.

A communication session may be resumed using fast authentication. Using fast authentication, authentication can be performed more efficiently and with greater flexibility. In fast authentication, a request for a communication session may be received from a user device or client. The request may further comprise a session identifier. In one example of the present invention, the server may receive the request and compare the session identifier with a stored session identifier associated with a previously established session. If a match is found, the session may be resumed using fast authentication.

In another example of the present invention, a session is resumed over a different authentication layer or a different network interface or technology than the first session. For example, the first session may be over a layer 2 authentication layer using, for example, 802.1X as the authentication protocol. In this example, the resumed session may be over a different authentication layer. For example, the resumed session may be resumed using fast authentication over the layer 3 authentication layer.

In another example of the present invention, a session is resumed over a different network interface. For example, a user device may be connected to a network through an 802.11 interface. If full authentication is performed at layer 2 through 802.1X and a corresponding session identifier is determined, for example, then fast authentication may be used on session resumption by connecting the user device to a network through a different interface. As an example, the session may be resumed through a physical interface on which PANA is running using fast authentication.

The present invention thus provides increased flexibility and efficiency using fast authentication in session resumption over a plurality of defined authentication protocols or network interfaces.

DETAILED DESCRIPTION OF THE DRAWINGS

Figure 1:
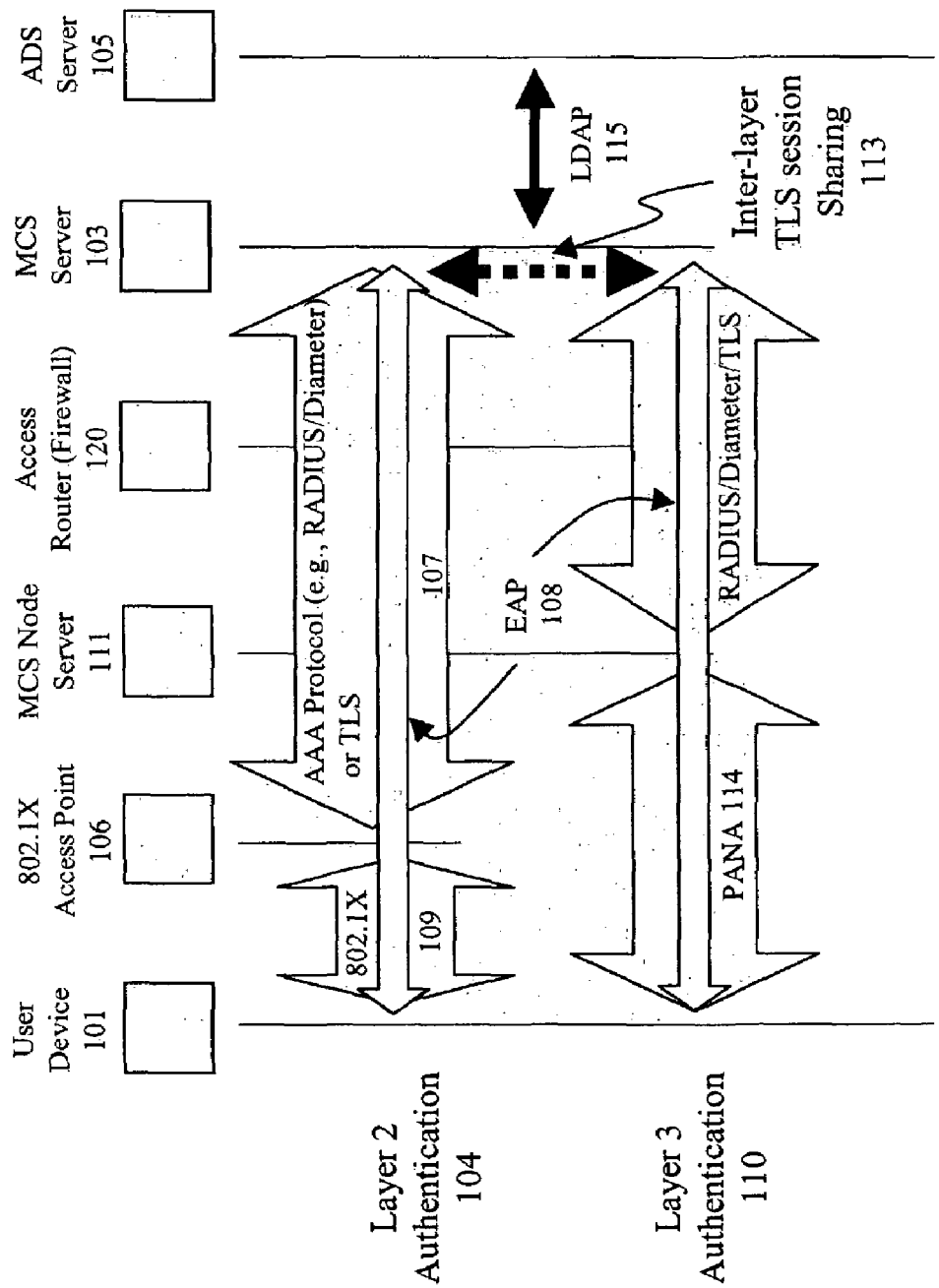
FIG. 1 illustrates an exemplary system in accordance with aspects of the present invention.

Aspects of the present invention provide a system and method for providing fast authentication or re-authentication between a user device or client accessing a network and an authenticator (e.g., server). Fast authentication or re-authentication may be performed, for example, across layers such as in interlayer sharing or across different sub-networks in one or more layers. If no established session is detected, full authentication may be performed.

Full authentication of a user device session occurs when the user device requests a session from an authenticator, such as a server, based on user credentials such as certificates and passwords. Specifically, full authentication typically occurs when there is no pre-established session based on the requested session detected. In full authentication, a user device obtains a certificate to access a network. Access to the network may be through wireless LANs, for example. The certificate may be obtained in a variety of ways such as but not limited to through a portable storage medium such as a floppy disk, SD card or a PCMCIA memory card or through connection through a wired Ethernet interface to a LAN. Full authentication occurs through an authentication layer such as layer 2 (802.1X) or layer 3 (e.g., PANA). When a user device is connected to the network through layer 2 but does not support 802.1X-based authentication, for example, full authentication may be performed through layer 3 (e.g., PANA).

In full authentication, the user certificate installed on the user device is presented to the authenticator (e.g., the server). Presentation of the user certificate may be through EAP-TLS, for example. The authenticator or the server receives the user certificate, verifies the status of the user certificate and, based on the user certificate, establishes an authentication session with the user device if the certificate is valid.

Typically, full authentication involves generating a master secret key and sharing the master secret key between the user device and the authenticator (i.e., the server). For example, with 802.1X authentication, keys may be distributed from the authenticator (i.e., the server) to an 802.11 access point and are used to secure data exchange between the user device and an 802.11 access point. Thus, in full authentication, certificate exchange and key exchange are typically performed and a session identifier may be derived. With the performance of these time-consuming steps, full authentication requires more time than fast or rapid authentication which does not require certificate or key exchange sequences.

In fast or rapid authentication, a session identifier is derived which is associated with an established session between a user device and an authenticator (i.e., a server). A session identifier may be an arbitrary byte sequence that identifies an active or resumable session state. A session identifier may be from an earlier connection, the present connection or any other currently active connection. If the session identifier is from a present connection, a client may update the random structures and derived values of a connection, for example. If the session identifier is from another currently active connection, several independent secure connections may be established without repeating the full handshake protocol. A request for resumption of a session may include a session identifier associated with the established session. For example, a session may be established through full authentication involving certificate and key exchange sequences. A session identifier may also be derived which is associated with, the session. When resumption of the session is requested as, for example, following disconnection of the session, a session identifier may be received and matched with a stored session identifier corresponding to the previously established session. Disconnection of a session may occur through a variety of ways. For example, a user may be mobile and may roam out of range of the first session such that the session must be resumed at a new location. Also, a user may switch to another. interface or authentication layer, for example.

If the received session identifier corresponds to the stored session identifier, then fast authentication may be performed between the user device and the authenticator (i.e., the server). In fast authentication or re-authentication, the session may be resumed more rapidly as compared to full authentication because in fast authentication, the session is reused by, for example, completing a handshake without performing a certificate or key exchange sequence.

In one embodiment of the present invention, a Mobility Communication System (MCS) provides network security including support for secure and fast roaming for user devices or mobile devices. Mobility may be enhanced through rapid authentication or re-authentication as, for example, through inter-sub-network roaming, intra-sub-network roaming, inter-layer session sharing, or mid-session IP mobility handoff.

In one embodiment, the system may contain wireless LAN or 802.1X-based authentication. In such a system, there may be dynamic generation and distribution of 802.11 per-packet encryption keys or secure and fast roaming. The system may further contain additional layers or higher layers of security features. For example, the system may contain Layer 2 and Layer 3 wireless security features. Layer 2 wireless features may include 802.1X or wireless LAN and Layer 3 wireless features may include PANA-based user authentication.

The system may utilize a variety of peer authentication techniques to provide a secure communication channel between peer entities. For example, Transport Layer Security (TLS) may be used in which a secure communication channel between peer entities may be established through certificate based peer authentication. With TLS, a master secret key is generated and key information is shared and exchanged based on public key technology. Additionally, TLS provides fast re-authentication capability as discussed herein by basing the, re-authentication on an already established master secret key. With fast authentication or re-authentication, a session may be resumed without, for example, performing certificate or key exchange sequences that are typically performed in full authentication procedures. In TLS "session resumption" (i.e., fast authentication), the already established master secret key between peers may be used as a credential to re-authenticate peers. Thus, instead of performing time-consuming full authentication involving complex and burdensome cryptographic computation to create a new master key, fast re-authentication may be accomplished more efficiently through the session resumption capability of TLS.

TLS messages may be carried in a framework that supports authentication methods. One example of such a framework is the Extensible Authentication protocol (EAP). EAP supports any number of authentication methods. For example, EAP supports PPP network access authentication. However, EAP may also support other network access authentication methods such as IEEE 802.1X or PANA (Protocol for Carrying Authentication for Network Access). IEEE 802.1X is an example of a Layer 2 network based technology. In addition, the authentication methods used with EAP may carry TLS messages to establish a secure channel between a client and an authentication server. These authentication methods include, for example, EAP-TLS (Extensible Authentication Protocol-Transport Layer Security), EAP-TTLS (EAP-Tunneled TLS protocol), or PEAP (Protected EAP). Authentication methods used in EAP that also support TLS messages may further support fast re-authentication through TLS session resumption.

PANA is a higher layer authentication network access authentication protocol that may be supported by EAP. PANA is a layer 3 protocol that may function independently from layer 2 technologies such as IEEE 802.1X. Although PANA may be used independently from layer 2 protocols, PANA may also be used simultaneously or in parallel with layer 2 protocols such as IEEE 802.1X, for example, for different purposes. As PANA is supported by EAP which also supports TLS based authentication, PANA may carry EAP for authenticating the client to provide for a more secure way for authentication.

FIG. 1 illustrates an exemplary system of the present invention. FIG. 1 illustrates a system capable of simultaneous or parallel use of layer 2 and layer 3 authentications. In this example, a user device 101 connects to the system. The user device 101 may be a mobile device such as a computer or a PDA but any variety of user devices capable of communicating over a network may be used. The user device 101 may communicate through a security component to an authenticator. For example, the user device 101 may communicate through an 802.11 interface (not shown) to an MCS server (Mobile Communication Server) 103 and authentication of the user device 101 may be accomplished at layer 2 (104). The MCS Server 103 may maintain the credentials of the user used to authenticate the user. Messages sent by the user via 802.1X protocol 109 may be intercepted by an access point 106. The access point 106 may intercept an EAP message from the user device 101 and pass the message to the MCS server 103. Passage of the message from the access point 106 to the MCS server 103 may involve the message being carried by an AAA protocol (i.e., authentication, authorization and accounting protocol) such as the RADIUS or Diameter protocol 107, or by a TLS protocol if MCS Node Server 111 can act as a TLS proxy which passes through TLS messages between the user device and the MCS server 103. The user device 101 connected on a wireless LAN in this manner may need security such that unauthorized users may not have access to the data.

In this example, 802.1X supports carrying EAP (108) such that layer 2 authentication 104 may support EAP-based authentication. For full authentication under EAP-TLS mechanisms, a user might, first obtain a certificate to access the network from 802.11 wireless LANs. However, user certificates are not limited to 802.11 wireless LANs as user certificates may be applicable to any number of corresponding networks and authentication protocols. For example, a user may obtain a certificate for use in PANA authentication. A user certificate may be obtained in a number of ways. For example, a user certificate may be obtained through any removable storage device and a readable medium such as a floppy disk, SD card or a PCMCIA memory card. Alternatively, a certificate may be obtained through a wired Ethernet interface from the sub-network in which the authenticator is located. In addition, the user certificate may be obtained by connecting the user device 101 through a cradle connecting a device that stores the user certificate. The user certificate may thus be obtained from the device that stores the user certificate. Full authentication does not necessarily require a user to present a user certificate for the authentication to succeed. Instead, the user can use username/password as credentials that can be carried over a secure TLS tunnel.

In the example of FIG. 1, during full authentication, a user certificate installed on the user device 101 may be presented to the MCS server 103 through, for example, EAP-TLS. EAP messages are transmitted from the user device 101 to the access point 106. The access point 106 receives the EAP messages from the user device 101 and passes the messages to the MCS server 103. The MCS server 103 may then authenticate the user if the user certificate is deemed to be valid by the MCS server 103 after verification of the status of the user certificate from the Active Directory Services Server (ADS) 105. For example, the MCS server 103 may access the ADS Server 105 by using the Lightweight Directory Access Protocol (LDAP 115) as illustrated in FIG. 1. After the user is authenticated, a TLS session may be established as an authentication session and the TLS session may be identified by a TLS session identifier. The TLS session may be associated with a master secret key generated and shared between the user device 101 and the MCS Server 103. When a new TLS session identifier is assigned, it is typically assigned by the MCS server.

FIG. 1 further illustrates higher layer authentication as layer 3 authentication 110. In this example, PANA 114 may be used as the protocol to carry EAP messages from the user device 101 to a layer 3 access point. In this example, the layer 3 access point is an MCS Node Server 111 which may be a PANA authentication agent. As in layer 2 authentication, the EAP messages in layer 3 authentication may be carried in the background by using a AAA protocol such as RADIUS or Diameter 112. If layer 3 authentication 110 is performed after successful completion of layer 2 authentication 104 and the generation of a TLS session identifier, then the TLS session identifier from layer 2 authentication 104 may be used for layer 3 authentication 110 and the layer 3 authentication 110 may also carry EAP messages with PANA 114 as the EAP carrier between the user device 101 and the MCS node server 111 in this example. Thus, using interlayer TLS session sharing 113, TLS session resumption functionality may be used for both layer 2 and layer 3 authentication and session information may be shared by authentication in the different layers. In this case, TLS session resumption may be accomplished through fast authentication or re-authentication.

As described, an established TLS session may be used for fast authentication or re-authentication. Fast authentication or re-authentication may be implemented across transitions, including transitioning across different authentication layers, for example, when different layers may be involved in different access control, or transitioning across different technology or different locations. Also, fast authentication or re-authentication may be implemented when any combination of transitioning occurs. For example, in interlayer TLS session sharing, a transition may occur across different authentication layers, for example from layer 2 (e.g., 802.1X) to layer 3 (e.g., PANA). Also, fast authentication or re-authentication may be performed during intra-technology or inter-technology handoff or during reconnection. If a session such as a TLS session had been established previously, a session identifier may be derived such that resumption of the TLS session may be accomplished through fast authentication or re-authentication such that a TLS handshake over EAP specifying the corresponding session ID may be performed. If a match is found, the session may be resumed under fast authentication. For example, the TLS handshake may be completed without exchanging a user certificate or performing a key exchange sequence. Thus, fast authentication is more efficient than full authentication.

Figure 2:
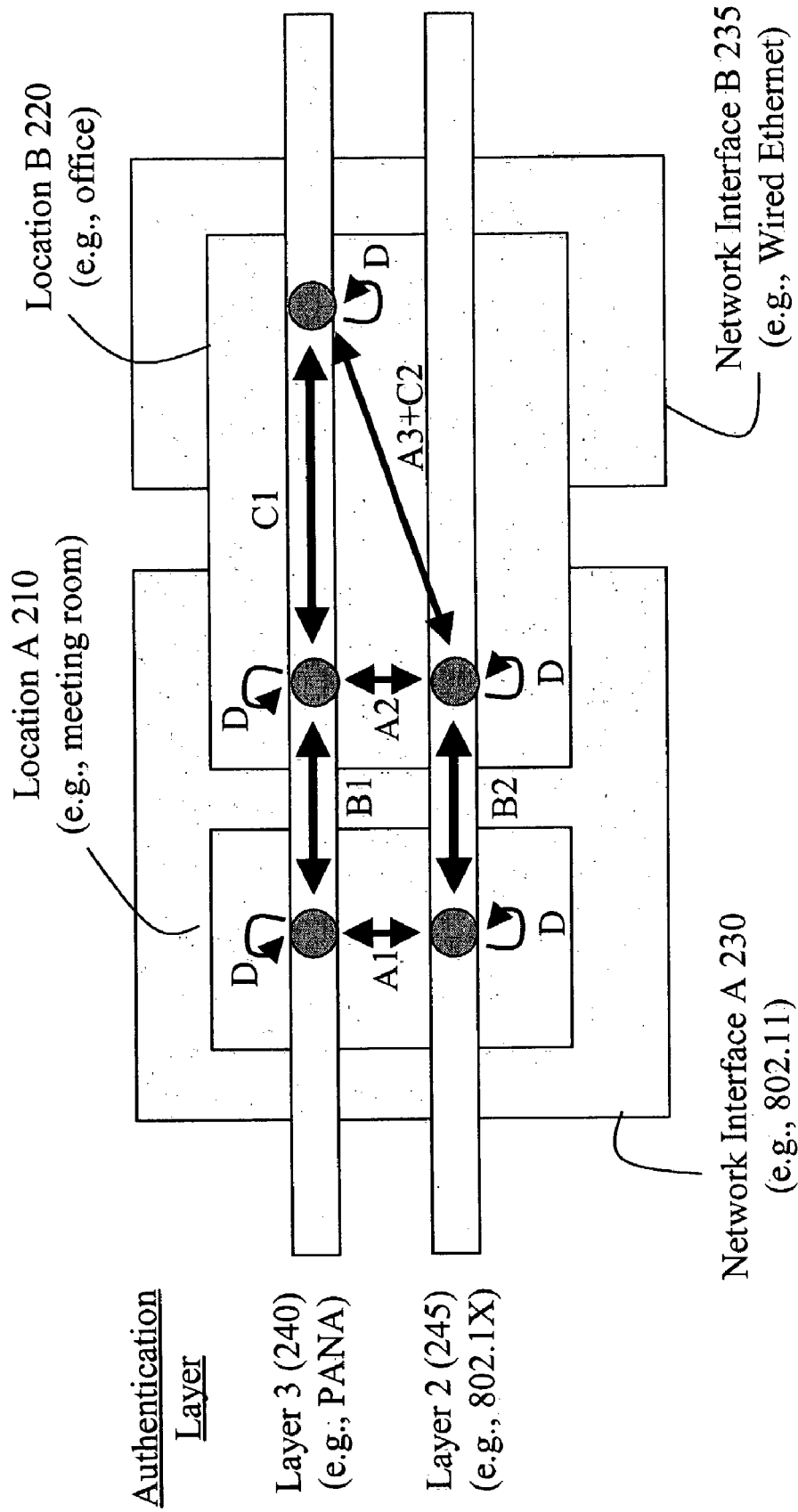
FIG. 2 illustrates examples of fast authentication in TLS session sharing in accordance with aspects of the present invention.

FIG. 2 illustrates an example of fast authentication in TLS session sharing. Two distinct physical locations are depicted in FIG. 2, for example a meeting room 210 and an office 220 with two examples of network interfaces (e.g., 802.11 (230) and Wired Ethernet (235) as illustrated in FIG. 2). In this example, it is assumed that a user device needs to connect to a different access point when it moves to a new location. Also shown in FIG. 2 are two authentication layers, Layer 2 (802.1X) 245 and Layer 3 (PANA) 240. Steps A1 and A2 illustrate interlayer TLS sharing between authentication layers for the same 802.1X wireless interface and the same location (i.e., the meeting room 210 and office 220, respectively). In this example, a user with a user device may share session information between both layer 2 authentication 245 and layer 3 authentication 240. This may be useful when the different layers are involved in different access control, for example.

FIG. 2 also illustrates examples of intra-technology handoff and inter-technology handoff. For example, a user may be engaged in an established wireless LAN 802.1X TLS session in a meeting room 210. While using the same interface to connect to the wireless LAN, the user may change his location from the meeting room 210 to the office 220. Handoff occurs from the meeting room 210 to the office 220 within the same technology and the same interface as illustrated in step B1 or B2. In one example, TLS session resumption may be applied to wireless LAN roaming where a wireless LAN user roams between access points. When the wireless LAN user roams out of range of a first access point (e.g., a meeting room 210) and enters the range of a second access point (e.g., the office 220), the second access point may establish a TLS session as the first access point is now out of range. However, the second access point may need to re-authenticate the client because the second access point, unlike the first access point, has not already authenticated the client. For wireless LAN roaming, session resumption may be accomplished within a layer-2 technology authentication protocol. For example, 802.1X may be used as a layer-2 authentication protocol designed to work over point-to-point IEEE 802 LAN segments. The 802.1X protocol runs between a layer-2 network access user to be authenticated by an authenticator.

Another embodiment of inter-technology handoff is exemplified in step C1 of FIG. 2. Handoff may occur between two network interfaces. In this example, the network interfaces are each of any different type. For example, as illustrated in step C1, a user may change the interface from a wireless LAN interface (802.11), 230 to a wired Ethernet interface 235 within the same authentication layer (e.g., layer 3).

Step A3+C2 of FIG. 2 illustrates a combination of intra-technology handoff and intertechnology handoff. Handoff may be accomplished between different network interfaces and different authentication layers. The network interfaces may be each of any different type and the authentication layers may be each of any different type. In this example, a user may change the interface from a wired Ethernet interface 235 to a wireless LAN interface 230 without changing location (i.e., in the office 220) while also sharing session information between both layer 2 authentication and layer 3 authentication.

In another illustrative embodiment (not illustrated), a combination of handoff between different locations, inter-technology handoff and interlayer TLS sharing between authentication layers may be performed. Handoff may be accomplished between different network interfaces, different locations and different authentication layers. The network interfaces may be each of any different type and the authentication layers may be each of any different type, and the location may be different. In this example, a user may change the interface from a wired Ethernet interface 235 to a wireless LAN interface 230 as well as changing the location (e.g., from a meeting room to an office) while also sharing session information.

Another example is to perform layer 2 authentication on the wired Ethernet by using 802.1X (not shown). Intra-technology handoff or inter-technology handoff may likewise occur as described to or from a different network interface (e.g., 802.11) or to or from a different authentication layer (e.g., layer 2 and layer 3 ).

FIG. 2 also illustrates reconnection. Step D indicates that a user device may continue to use the same interface, the same location and the same authentication layer to re-establish a connection. For example, a user may be engaged in an established TLS session when the user shuts down the device. After time has elapsed, the user may return to the device and turn it on to re-establish a connection in the network. No handoff occurs in this example but re-authentication may occur because the authentication status is removed at the access point. The access point does not hold an authentication status for long for security purposes. For example, if a user shuts down the device, a third party might attempt to access the access point if the authentication status was still active.

As described herein, TLS session sharing may be used for re-authentication in a variety of situations including multi-layer authentication, intra-technology handoff, inter-technology handoff and re-connection. TLS session sharing may be implemented on a system such that multiple protocol entities share a TLS session with the protocol entities being implemented as separate processes in the operating system. Hence, in one example of implementation of the TLS session sharing technology, protocol specific modules may be used where any module may contain a set of procedures.

Figure 3:
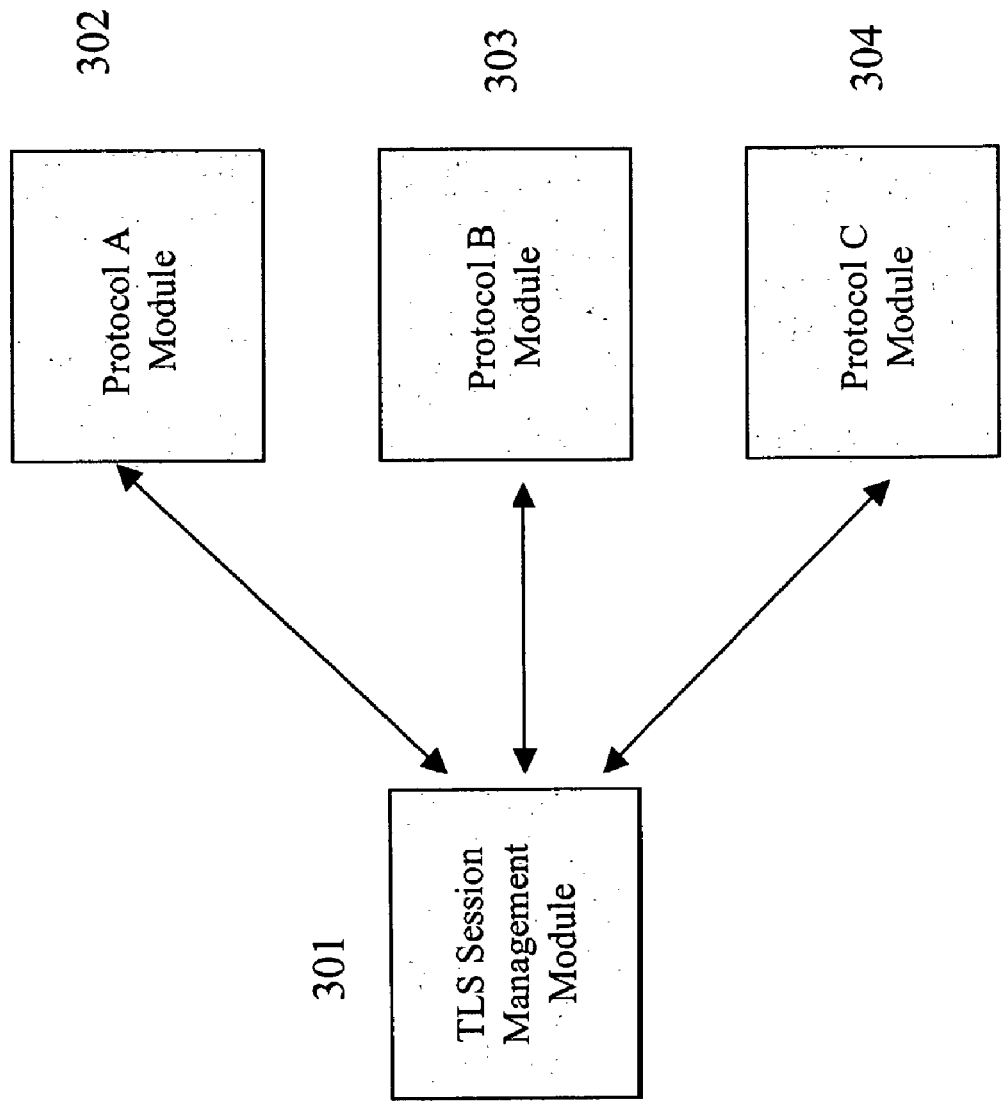
FIG. 3 illustrates an example of a general architecture for implementation of TLS session sharing in accordance with aspects of the present invention.

Implementation of TLS session sharing technology may include protocol modules implemented as separate programs or processes. In this case, a separate module may be provided for performing TLS session management or defining communication methods between the TLS session management module and each protocol module. FIG. 3 illustrates an example of a general architecture for implementation of TLS session sharing. In this example, the session utilizes a TLS session management module 301 that manages the TLS session. The TLS session management module 301 may store the TLS sessions shared among protocol modules and may communicate with other modules (302, 303, 304) through an inter-module communication mechanism such as an Application Programming Interface (API) (not shown). For example, if a protocol specific module creates a new TLS session, deletes an existing TLS session, modifies a parameter of an existing TLS session, retrieves a specific parameter of an existing TLS session or sends/receives data over a TLS connection, the inter-module communication mechanism may be used to facilitate communication. In addition, the inter-module communication mechanism may also provide peering of modules such that only trusted modules may communicate with each other or may detect unavailability of a peer module so that appropriate error handling may be performed.

The modular structure of the implementation of the TLS session sharing provides improved TLS session management. If the protocol modules are distinct and separate and the TLS session management contains TLS session information in the form of a memory image, the program using a memory pointer to point to the memory location of a TLS session may be ineffective because the memory pointer may not be unique among different processes. Thus, if different process entities access the memory pointer of a different process, then problems may arise because the memory pointer may not be used to share information among different processes. Therefore, an external session handler may be used instead of the memory pointer. The external session handler is an integer value assigned by the TLS session management module and is unique for each of the protocol specific modules. In this way, each protocol-specific module may uniquely specify a TLS session.

The modular structure of the implementation of the TLS session sharing further provides robustness in functionality because modules performing remote processes may not always be working. If a remote process is terminated, for example, the remote process may be detected as no longer operational and the remote module may be detected as unavailable.

Also, security may be an important consideration in the modular structure of the implementation of the TLS session. Therefore, to prevent $3^{rd}$ party attacker access to private information through, for example, the attacker inserting a module into the TLS session to obtain unauthorized information, communication between modules may contain security measures provided herein.

Figure 4:
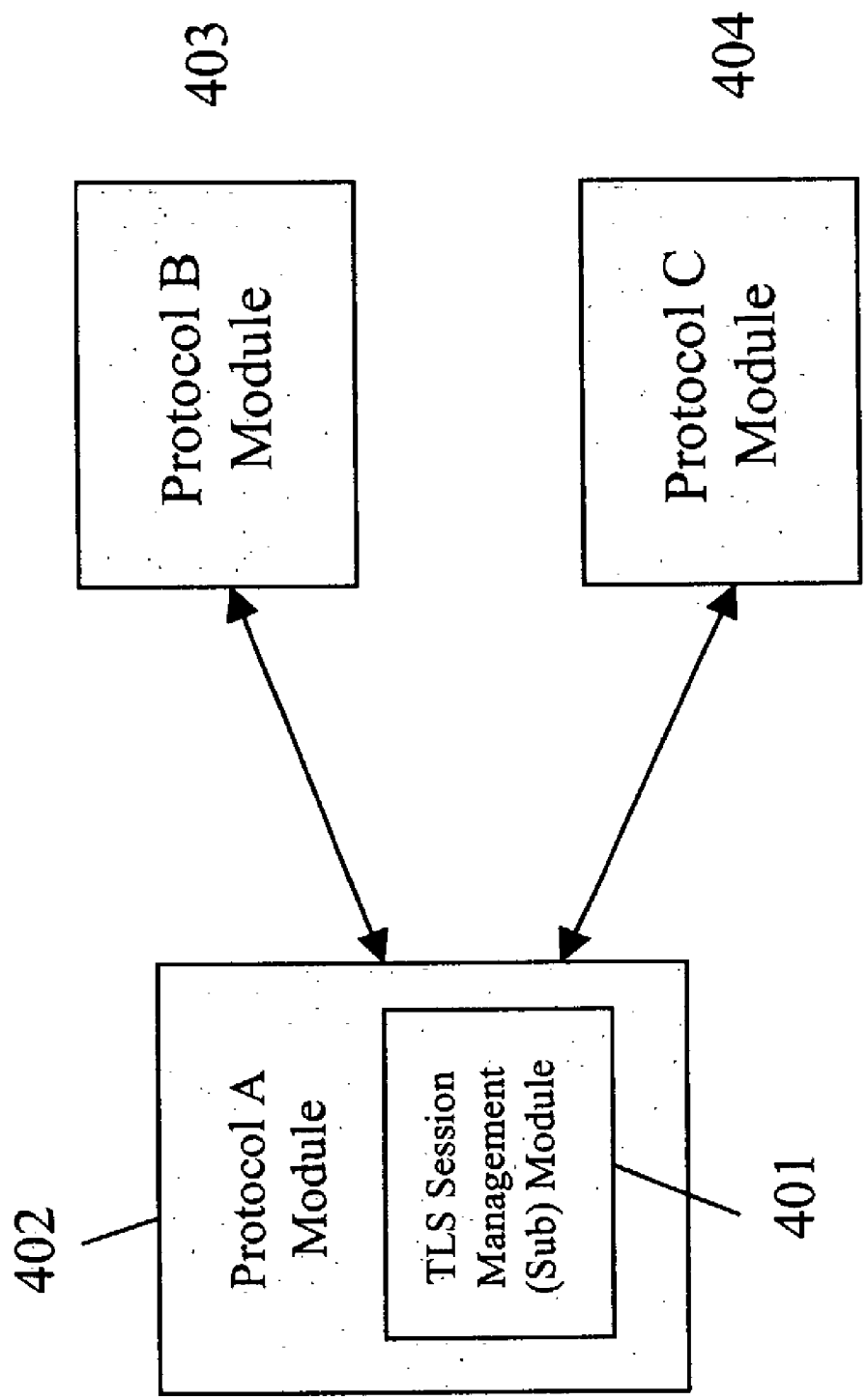
FIG. 4 illustrates an alternative general architecture for implementation of TLS session sharing in accordance with aspects of the present invention.

FIG. 4 illustrates an alternative architecture for implementation of TLS session sharing in which the TLS session management module 401 is incorporated into or co-located at one of the protocol specific modules (402). The TLS session management module 401 then communicates with other protocol specific modules (403, 404). Thus, one of the protocol specific modules includes the TLS session management module as a sub-module. This may be used, for example, when a specific protocol is dominant to the other protocol modules.

The TLS session management module maintains TLS session information for each TLS session. The TLS session information may include parameters and other information in addition to information specific to the TLS protocol. Parameters may include, for example, the external session handle described above, a reference counter which is an integer value that indicates the number of entities or protocol modules that share in the TLS session, a server identifier for identifying the TLS session management module, a server public and private key, or parameters associated with protocol-specific modules such as but not limited to client information such as an identifier, public key, master secret, random numbers or a timer for detecting unavailability of peer modules, for example.

Each protocol-specific module may maintain session information including, but not limited to an external session handle or parameters including but not limited to a server identifier or public key, a client public key, random numbers associated with the client or server, master secret or a timer such as a "keep-alive timer" for detecting unavailability of a peer module.

Figure 5:
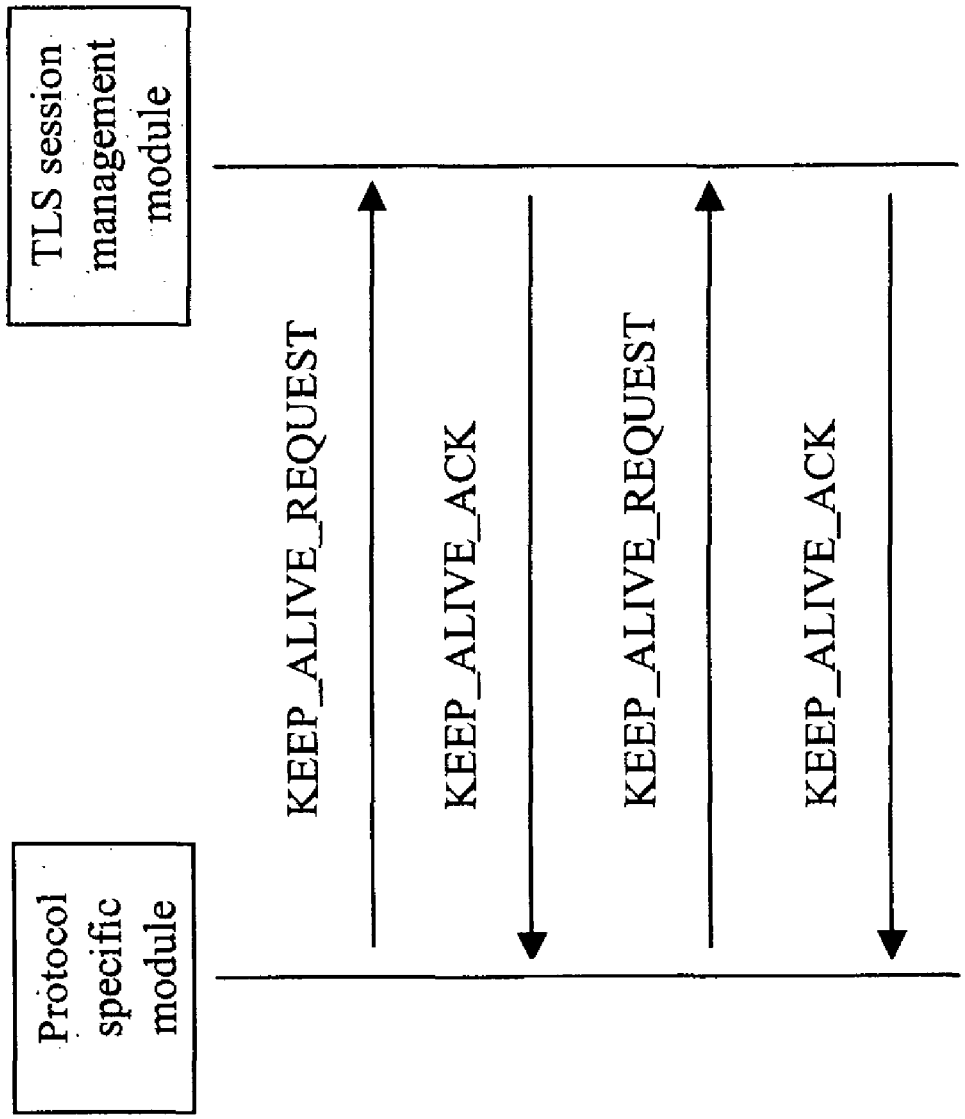
FIG. 5 illustrates an example of peer unavailability detection in accordance with aspects of the present invention.

FIG. 5 shows an example of peer module unavailability detection. In this example, "keep alive" information is authenticated. For example, an identifier and a message integrity check (MIC) parameter may be sent in a request to keep the connection alive (e.g., "KEEP_ALIVE_REQUEST") from a TLS session management module to a protocol-specific module. For example, the parameters may contain a random number stored in the module for enhanced security. If the keep alive is not acted on within a predetermined time period, then the protocol specific module can regard the TLS session management module as unavailable. In this example, if it is determined that the TLS session management module is not available, then connections related to the TLS sessions managed by the TLS module are terminated. Likewise, if the TLS session management module detects unavailability of the protocol specific module, then old TLS sessions are also discontinued if no other module shares the session. In this case, the reference counter may be used to indicate the number of entities that share the TLS session. Thus, if the reference counter indicates that there are no additional modules in the TLS session, the connection is terminated.

Thus, a system and method are provided for establishing a network communication session using fast authentication. In a network system a client or user device may establish a communication session with a server using full authentication. If the session is interrupted or discontinued and resumption of the session is requested, a session identifier of the previously established session may be compared to the session identifier of the requested session. If a match is detected, the session may be resumed using a fast authentication (or re-authentication) procedure such that the session is resumed more efficiently and expediently. Fast authentication may be performed, for example, even when the first session and the resumed second session are of different authentication layers, different types of network interfaces and/or different locations. Thus, a session, such as a TLS session, may resume functionality among multiple defined authentication protocols or technologies such as 802.1X, PANA or cellular based systems.

Figure 6:
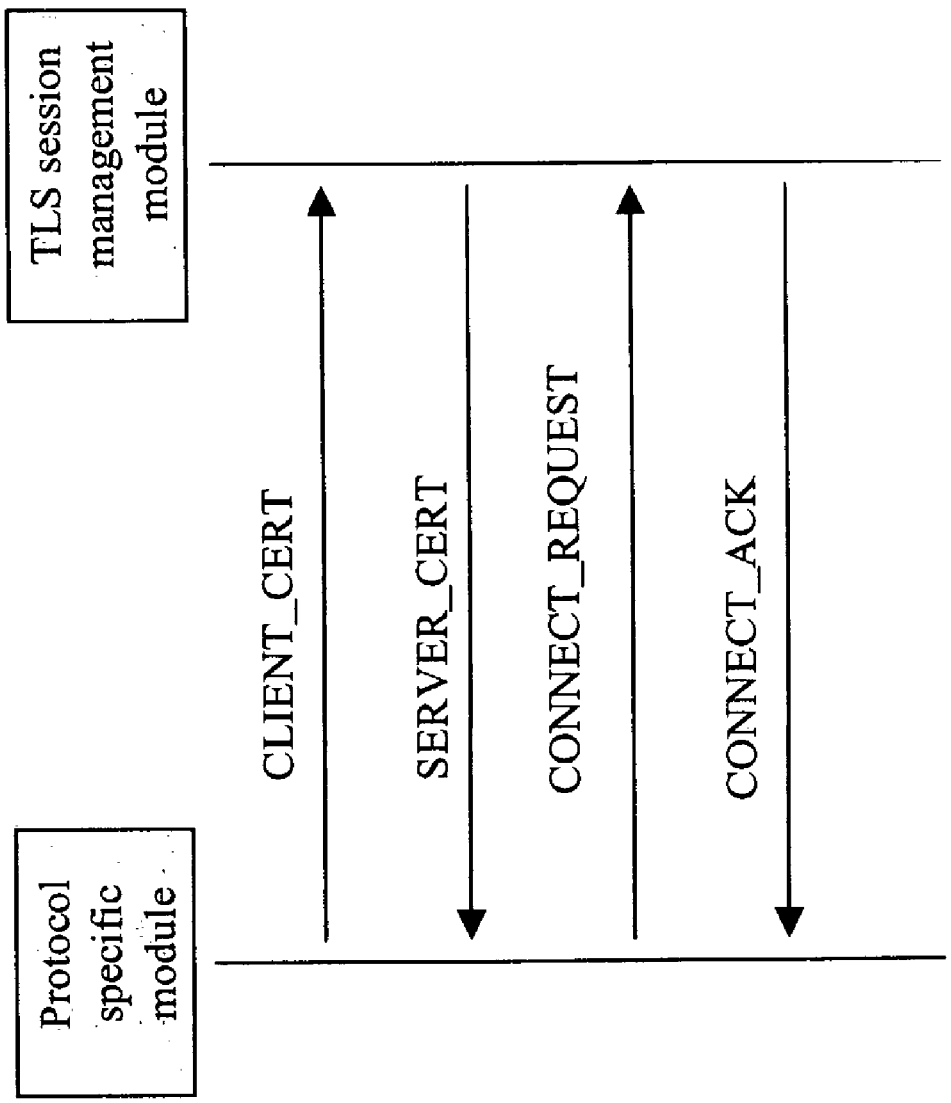
FIG. 6 shows an example of connection establishment between a peer module and the TLS session management module in accordance with aspects of the present invention.

FIG. 6 shows an example of connection establishment between a peer module (e.g., protocol specific module) and the TLS session management module. When the peer module starts communicating with the TLS session management module, it sends a message (e.g., "CLIENT_CERT") that contains, for example, a public key of the peer module and security association parameters such as a nonce and a Diffie-Hellman public value. When the TLS session management module receives the CLIENT_CERT message, it returns a message (e.g., "SERVER_CERT") that contains, for example, a public key of the TLS session management module and security association parameters such as a nonce and a Diffie-Hellman public value to the peer module. The pair of the security association parameters in the two messages is used for establishing a shared key between the two entities by using a well-known Diffie-Hellman key exchange algorithm. Then the peer module sends a message ("CONNECT_REQUEST") that contains, for example, an integrity check value for the CONNECT_REQUEST message in order for the peer module to be authenticated to the TLS session management module by using the public key contained in the CLIENT_CERT message. The TLS session management module which receives the CONNECT_REQUEST message will perform integrity check for the message and returns CONNECT_ACK which includes the validity check result as well as an integrity check value in order for the TLS session management module to be authenticated to the peer module by using the public key contained in the SERVER_CERT message. All messages except for CLIENT_CERT and SERVER_CERT may be encrypted and/or integrity protected by using the shared key, including the messages used in FIGS. 7 and 8.

Figure 7:
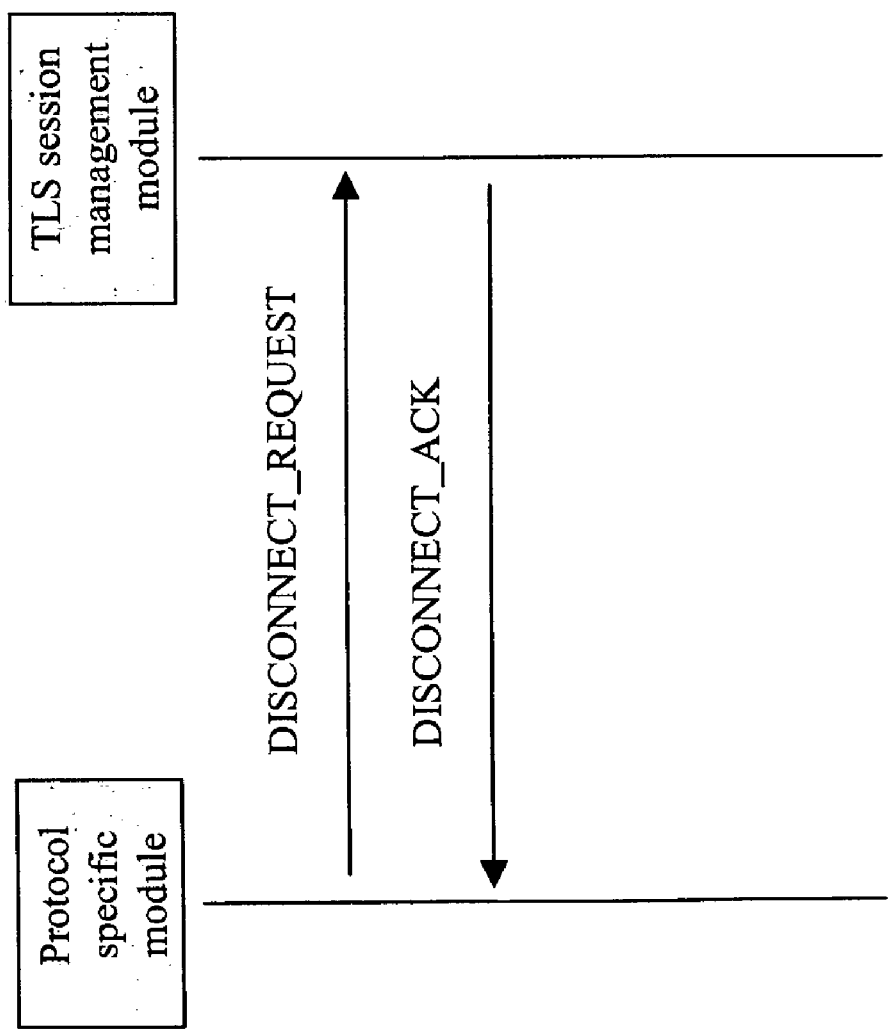
FIG. 7 shows an example of disconnection sequence in accordance with aspects of the present invention.

FIG. 7 shows an example of disconnection sequence. When a peer module wants to terminate the connection established with the TLS session management module, it sends a message (e.g., "DISCONNECT_REQUEST") to the TLS session management module and the TLS session management module returns a message (e.g., "DISCONNECT_ACK") to the peer module. A DISCONNECT_REQUEST can also be sent from the TLS session management module where the peer module will return a DISCONNECT_ACK to the TLS session management module in that case.

Figure 8:
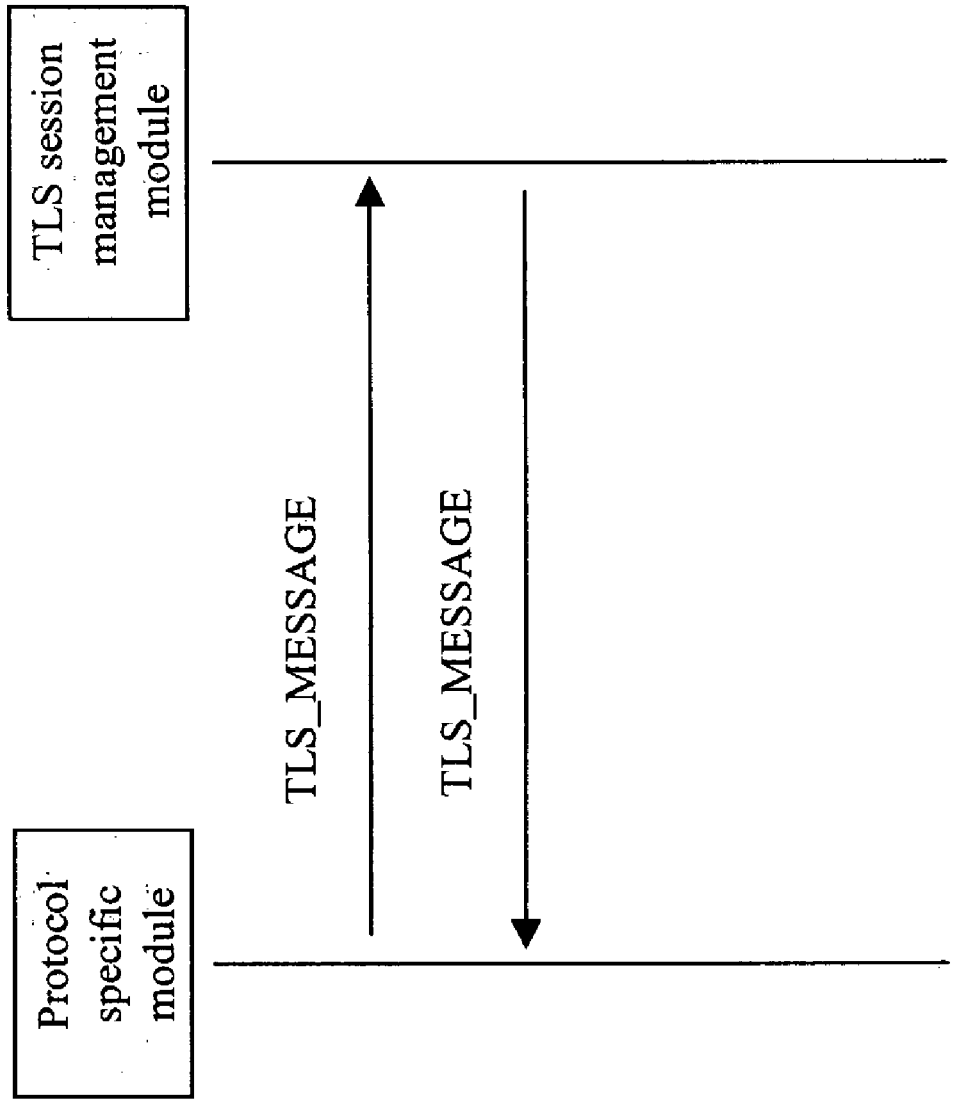
FIG. 8 shows an example of TLS message exchange sequence in accordance with aspects of the present invention.

FIG. 8 shows an example of TLS message exchange sequence. After a connection is established and before the connection is terminated between a peer module and the TLS session management module, messages that carries TLS messages ("TLS_MESSAGE") are exchanged between the two entities and these messages also carry an external session handle to identify a TLS session.

It is understood that the present invention can take many forms and embodiments. The embodiments shown herein are intended to illustrate rather than to limit the invention, it being appreciated that variations may be made without departing from the spirit of the scope of the invention.

Although illustrative embodiments of the invention have been shown and described, a wide range of modification, change and substitution is intended in the disclosure and in some instances some features of the present invention may be employed without a corresponding use of the other features. Accordingly, it is appropriate that the appended claims be construed broadly and in a manner consistent with the scope of the invention.

What is claimed is:

1. A method for establishing a network communication session using fast authentication comprising:
   establishing a first session between a client and a server in a network with full authentication, said first session using a first authentication layer and a first network interface and said establishing a first session comprising determining a first session identifier associated with the first session;
   receiving a request for establishing a second session, said second session using a second authentication layer and a second network interface and said request comprising a second session identifier;
   comparing the second session identifier with the first session identifier; establishing the second session with fast authentication corresponding to the first session and based on said comparing;
   maintaining, at the server, a count that indicates a number of entities or protocol modules that share sessions the network communication session;
   terminating the communication session responsive to determining that the count indicates that there are no additional entities or protocol modules sharing in the network communication session;
   wherein the first authentication layer and the second authentication layers are different authentication layers; and
   wherein the first network interface and the second network interface are different network interfaces.

2. The method of claim 1 wherein the first authentication layer uses an 802.1X authentication protocol and the second authentication layer uses a PANA authentication protocol.

3. The method of claim 1 wherein the first network interface is a 802.11 network interface and the second network interface is a wired Ethernet network interface.

4. The method of claim 1 wherein the first network interface is an 802.11 network interface and the second network interface is a cellular based network interface.

5. The method of claim 1 wherein said step of establishing a first session between a client and a server comprises:

receiving user credentials at the server, said user credentials corresponding to the client;

verifying the user credentials;

establishing an authentication session based on said verifying.

6. The method of claim 5 wherein the server receives the user credentials through EAP-TLS.

7. The method of claim 5 wherein said step of verifying the user credentials comprises accessing a database, said database storing client information.

8. The method of claim 5 wherein said step of verifying the user credentials comprises access an Active Directory Services (ADS).

9. The method of claim 1 wherein said step of establishing a first session between a client and a server comprises determining a master secret, said master secret shared between the client and the server.

10. The method of claim 9 wherein the master secret is associated with a TLS session.

11. The method of claim 9 further comprising deriving keys for securing data based on said master secret.

12. The method of claim 1 wherein said step of establishing the second session with fast authentication comprises completing a handshake without exchanging user credentials.

13. The method of claim 12 wherein said step of establishing the second session with fast authentication further comprises completing a handshake without exchanging keys.

14. A system for establishing a network communication session using fast authentication comprising:

an access point for relaying a message, said message comprising a received session identifier and a request for a communication session on a first authentication layer using a first network interface;

a server capable of receiving the message from the access point and capable of comparing the received session identifier to a stored session identifier, said stored session identifier corresponding to a previously established session on a second authentication layer using a second network interface;

wherein the server establishes a network communication session using fast authentication if the received session identifier matches the stored session identifier;

wherein the server maintains a count that indicates a number of entities or protocol modules that share in the network communication session;

wherein the server terminates the network communication session responsive to determining that the count indicates that there are no additional entities or protocol modules sharing in the network communication session;

wherein the first authentication layer and the second authentication layers are different authentication layers; and wherein the first network interface and the second network interface are different network interfaces.

15. The system of claim 14 wherein the server receives the message from the access point via an authentication, authorization and accounting (AAA) protocol.

16. The system of claim 15 wherein the AAA protocol is a RADIUS or Diameter protocol.

17. The system of claim 14 wherein the server receives and verifies user credentials.

18. The system of claim 17 wherein the server verifies the user credentials by accessing an Active Directory Services Server (ADS).

19. The system of claim 18 wherein said accessing comprises accessing via a Lightweight Directory Access protocol (LDAP).

20. The system of claim 14 wherein the first authentication layer uses a PANA authentication protocol and the second authentication layer uses an 802.1X authentication protocol.

21. The system of claim 14 wherein the server establishes a network communication session using fast authentication by completing a handshake without exchanging a user certificate.

22. The system of claim 14 wherein the server establishes a network communication session using fast authentication by completing a handshake without exchanging keys.

* * * * *

UNITED STATES PATENT AND TRADEMARK OFFICE
CERTIFICATE OF CORRECTION

PATENT NO. : 7,587,598 B2  Page 1 of 1
APPLICATION NO. : 10/609685
DATED : September 8, 2009
INVENTOR(S) : Yoshihiro Ohba et al.

It is certified that error appears in the above-identified patent and that said Letters Patent is hereby corrected as shown below:

On the Cover Page, item (75) Inventor:
        Please delete "Yashuhiro Katsube" and insert --Yasuhiro Katsube--.

On Page 2, item (56) Other Publications, Column 2, Reference 10:
        Please delete "October 26, 2001" and insert --October 26, 2004--.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,587,598 B2
APPLICATION NO. : 10/609685
DATED : September 8, 2009
INVENTOR(S) : Ohba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Fourteenth Day of December, 2010

David J. Kappos
*Director of the United States Patent and Trademark Office*